United States Patent [19]

Fortez et al.

[11] Patent Number: 5,509,247
[45] Date of Patent: Apr. 23, 1996

[54] VIBRATION-DAMPING INSIDE ROOF CONSTRUCTION

[75] Inventors: Maurice Fortez, Vanves, France; Thorsten Alts, Gross-Bieberau, Germany

[73] Assignee: Matec Holding AG, Küsnacht, Switzerland

[21] Appl. No.: 125,250

[22] Filed: Sep. 23, 1993

[30] Foreign Application Priority Data

Sep. 23, 1992 [CH] Switzerland ............ 02974/92

[51] Int. Cl.⁶ .................. E04B 1/74; E04C 2/32
[52] U.S. Cl. ............ 52/630; 52/789.1; 52/791.1; 181/284; 181/293; 181/294; 296/39.3; 296/214; 428/180
[58] Field of Search .............. 52/145, 144, 794.1, 52/789.1, 791.1, 783.1, 784.1, 630; 428/180; 181/208, 284, 288, 290, 291, 292, 293, 294; 296/39.3, 214

[56] References Cited

U.S. PATENT DOCUMENTS

| 1,751,249 | 3/1930 | Rosenblatt | 52/145 X |
|---|---|---|---|
| 2,008,718 | 7/1935 | Jenkins | 52/145 X |
| 2,019,233 | 10/1935 | Nicol, Jr. | 181/291 X |
| 2,209,825 | 7/1940 | Mazer | 181/290 X |
| 2,271,871 | 2/1942 | Newport et al. | 52/145 |
| 2,355,568 | 8/1944 | Smith | 52/145 X |
| 2,809,908 | 10/1957 | French | 428/180 |
| 2,879,197 | 3/1959 | Muskat et al. | 181/294 X |
| 4,263,356 | 4/1981 | Nomura et al. | 181/290 X |
| 4,432,580 | 2/1984 | Lohmar et al. | 181/290 X |
| 4,555,433 | 11/1985 | Jablonka et al. | 428/180 X |
| 4,584,232 | 4/1986 | Frank et al. | 181/294 X |
| 4,734,323 | 3/1988 | Sato et al. | 181/208 X |
| 4,805,724 | 2/1989 | Stoll et al. | 181/294 X |
| 4,807,411 | 2/1989 | Capaul | 52/809 X |
| 4,851,283 | 7/1989 | Holtrop et al. | 181/294 X |
| 4,886,696 | 12/1989 | Bainbridge | 181/284 X |
| 5,296,657 | 3/1994 | Gilliland et al. | 181/294 |

FOREIGN PATENT DOCUMENTS

| 79253 | 5/1983 | European Pat. Off. | 296/39.3 |
|---|---|---|---|
| 2618827 | 2/1989 | France | 52/809 |

Primary Examiner—Carl D. Friedman
Assistant Examiner—Kevin D. Wilkens
Attorney, Agent, or Firm—Popham, Haik, Schnobrich & Kaufman, Ltd.

[57] ABSTRACT

A roof construction has vibration dampening ability and includes a body member in contact with a waffle-like surface of a moulded porous compressed fibrous web which is designed to have a self-supporting stability. The waffle-like surface exhibits an anisotropic air resistant structure.

14 Claims, 2 Drawing Sheets

VIBRATION-DAMPING INSIDE ROOF CONSTRUCTION

The present invention relates to a vibration-damping inside roof construction comprising at least one body member and a sound-absorbing moulded part, which is made of a porous material, especially a compressed web; and a sound-absorbing moulded part that is suitable for such a vibration-damping inside roof construction.

Inside roof constructions with such moulded parts are used in all kinds of vehicles and preferably in passenger cars, travel buses, truck driver's cabs, railway trains or airplanes and can also be used in all kinds of machine housings. Inside roof constructions were originally installed only for aesthetic reasons, i.e. for lining purposes. Today they must also meet increasingly engineering requirements and are installed in particular for sound absorption. Thus, it is known to cement to the individual body members open-cell foam or fibrous web mats that absorb to a high degree the sound field generated inside the passenger compartment. However, it has been demonstrated that the sound field generated by means of the vibrations of the individual body components and in particular the roof of the vehicle is only inadequately damped or even not at all by these elastic mats. Everyone is familiar with these low frequency vibrations as unpleasant humming.

Therefore, attempts have already been made to stiffen the vibrating body members by means of additional bracing or by cementing suitable materials over large areas. Yet these measures are suitable only to a limited degree for damping the vibration, lead to an undesired increase in weight of the entire inside roof construction, and increase the cost of fabrication of the individual vehicles.

Therefore, the object of the present invention is to provide an inside roof construction that does not exhibit the drawbacks of the known systems and in particular an inside roof construction that effectively damps the vibrations in the range below 200 hertz, especially in the range from 30–150 hertz without an increase in weight and at the same time retains completely its sound-absorbing efficiency.

This problem is solved by the invention by means of an inside roof construction comprising at least one body member and a sound-absorbing moulded part. The moulded part is made of a porous material, preferably a compressed fibrous web. In order to dampen the low frequency vibrations of the body member, the moulded part has a self-supporting stability, and has a side part that faces the body member and exhibits an anisotropic air resistant structure provided by a waffle-like structured surface which rests with its structured side in contact with the body member. Further, the moulded part preferably achieves its self-supporting stability through a stiffening layer, and is partially connected to the inside roof construction.

The inside roof construction according to the invention is characterized by the features described above and in essence by the fact that a porous sound-absorbing moulded part exhibits at least on its side facing the body member a surface that is structured, for example, like a waffle and this surface rests directly on the body member to be damped. At the same time the specific structure of the surface is immaterial. The purpose of this structure is to impede the air currents, caused by the vibration of the body member, less in the direction of the contact surface than the air flows at right angle thereto. The optimal dimensioning of this air resistant structure is within the normal capacities of a person skilled in the art. Another important feature of the construction according to the invention is that the moulded part is in essence self-supporting, i.e. does not have to be suspended from the body member. It is self-evident that the moulded part can also be attached point-by-point to the body member, in particular to achieve sound and vibration damping deformations at the bearing points, bearing segments of the moulded part respectively.

In a preferred embodiment the sound-absorbing moulded part is made of a compressed web that, in addition to the waffled surface structure, exhibits depressions that have a stiffening effect. In the regions of these lattice-type depressions the web is extremely radically compressed and results in an extremely rigid structure. This rigid inner structure of the moulded part allows this moulded part to rest without tension on the body member. These depressions can also be used in an advantageous manner to run electric cables or aerial cables. It is also obvious that these depressions can be designed with an electrically insulating and/or glass fiber reinforced material.

The invention is explained in detail in the following with the aid of the Figures.

Figure 1:
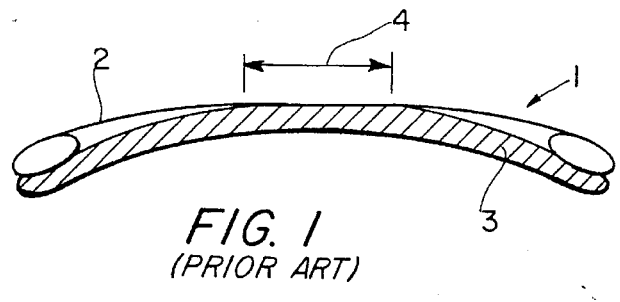
FIG. 1 is a cross sectional view of the prior art inside roof construction.

The cross section of a known inside roof construction as shown in FIG. 1 shows a body member 2, formed typically from a sheet metal member and a sound-absorbing mat 3, which is cemented to this sheet metal member 2. This sound-absorbing mat 3 is made for acoustical reasons from an open-cell and as elastic as possible material or a foam-rubber like material or a soft fibrous web. To stiffen this body member 2 an adhesion surface area 4 is usually chosen as large as possible.

Figure 2:
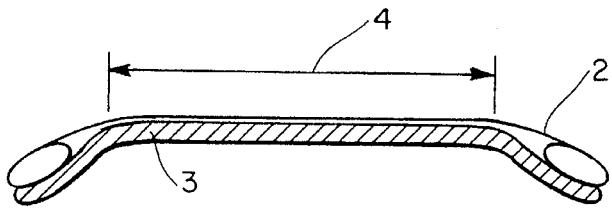
FIG. 2 is a cross sectional view of an inside roof constructon with improved vibration damping.

FIG. 2 is a cross sectional view of an inside roof construction cemented over a large area. In contrast, the moulded part 5 according to the invention is self-supporting and rests only partially on the body member 2.

Figure 3:
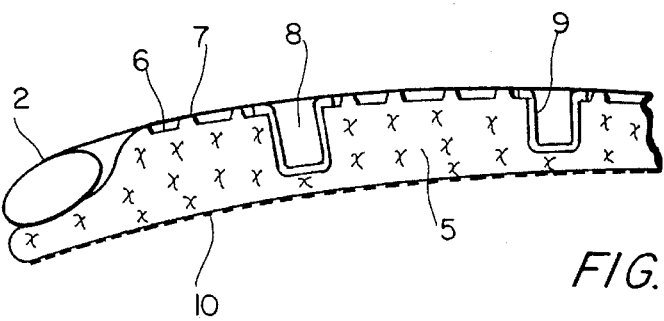
FIG. 3 is a cross sectional view of an inside roof construction according to the invention.
Figure 4:
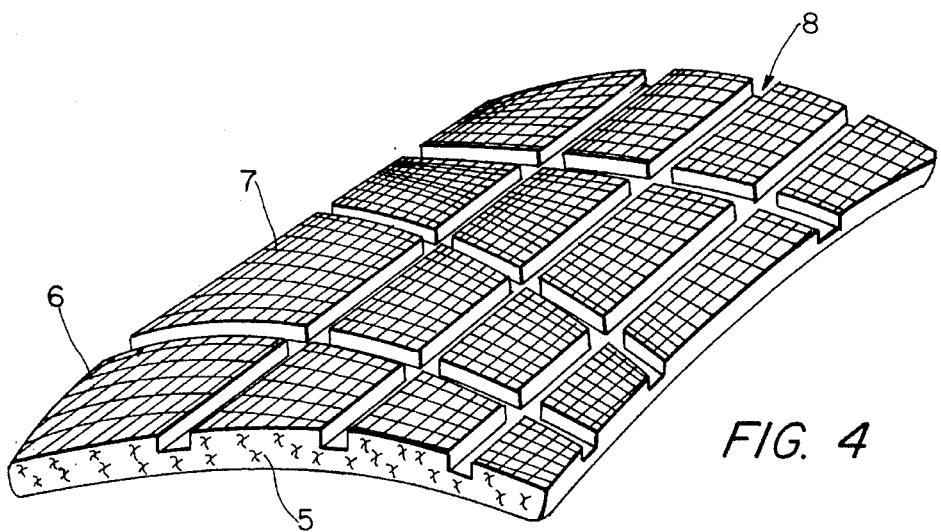
FIG. 4 is a top view of the surface structure of a moulded part according to the invention.

FIG. 3 shows the moulded part 5 according to the invention. Its preferred embodiment comprises a suitably compressed web 5 and exhibits a total thickness of less than 14 mm. Such webs are made of a mixture of natural and synthetic fibers bonded with suitable synthetic resins. Such a product is commercially available under the name TACA and is mentioned here only as an example. The side of this fibrous web 5 that faces the body member 2 is structured in a special manner. In a preferred embodiment this side is embossed like a waffle in order to hold the air resistance for the air movements in the surface direction lower than that for the air movements in the thickness direction. At the same time the embossing surfaces 6 forming the waffle-type pattern are stamped by approximately 2 mm into the moulded part 5 between the segments 7.

According to the invention, the moulded part 5 is self-supporting and does not have to be attached to the body member 2. At the same time it is irrelevant whether the self-supporting property of the moulded part results from locally stiffened regions or layers or is the result of embedding a load-bearing lattice.

However, what is essential to the invention is that the individual segments 7 of the waffle-type structure rest on the body member 2. Therefore, one portion of these segments can be cemented or fused to the body member 2 as an aid.

In another embodiment the moulded part 5 is formed by layers with varying degrees of sealing. In particular, the side of the moulded part 5 facing the passenger compartment is sealed better and thus designed so stable that the entire moulded part 5 can be permanently mounted as a self-supporting component. To this end, it has only to be attached to the edges.

It is obvious that this moulded part 5 can also be constructed like a sandwich consisting of several layers that are more or less sealed and exhibiting or not exhibiting intermediate layers, in particular microporous foils. The specific acoustic optimization depends significantly on the dimensions and the geometry of the individual body members and is within the normal capacities of a person skilled in the art. Yet what is essential to the invention is the described anisotropic air resistance of the moulded part 5 and the merely partial resting on the body member, which is made possible only by means of its self-supporting strength.

The acoustic system built in this manner has proven surprisingly simple to manufacture, i.e. especially as one piece and shows in the low frequency range surprisingly good damping characteristics with respect to useful systems. According to the invention, the low frequency body vibrations below 200 hertz are also damped in an effective manner with this construction.

Figure 5:
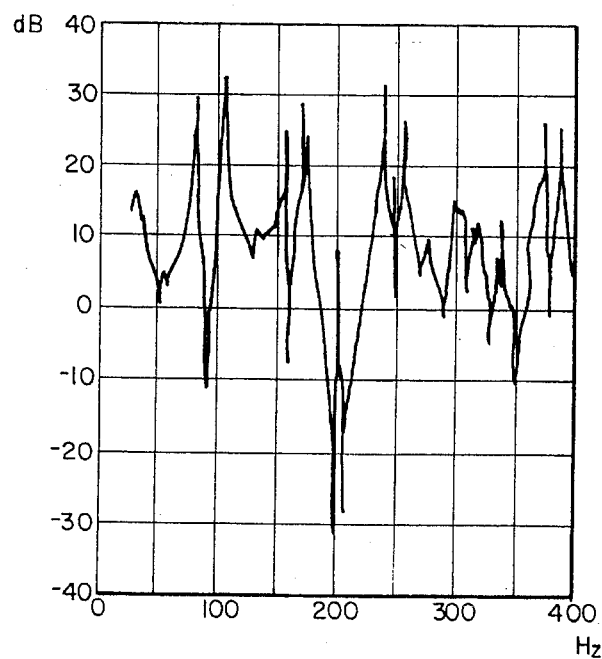
FIG. 5 depicts the vibration damping measurement curve of an uncoated body member.
Figure 6:
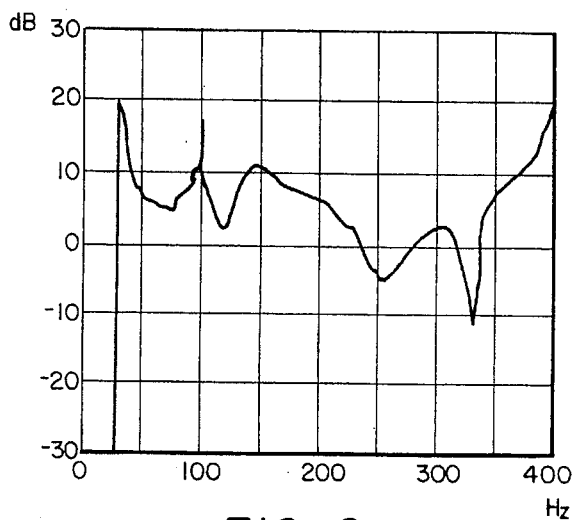
FIG. 6 depicts the vibration damping measurement curve of a body member with a conventional layer.
Figure 7:
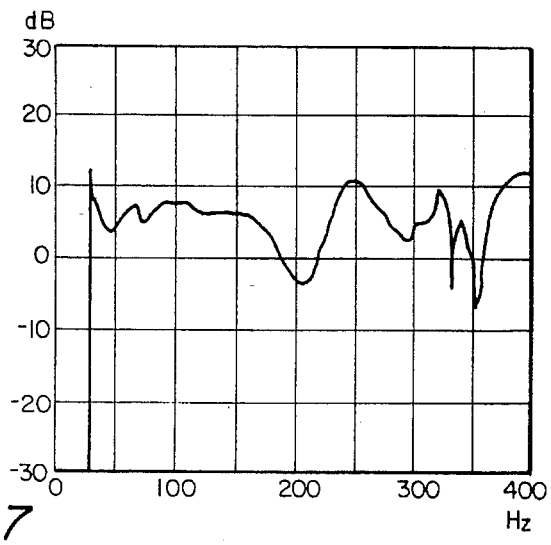
FIG. 7 depicts the vibration damping measurement curve of a body member equipped according to the invention.

This efficiency is especially clear from FIGS. 5, 6, and 7, of which FIG. 7 shows the vibration damping measurement curve of a conventional damping system with a fused layer of bitumen. In contrast, the vibration damping measurement curve of a spring-mass system in FIG. 7 shows definite improvement, in particular in the frequency range below 220 hertz. As a reference, FIG. 7 shows the vibration damping measurement curve of the undamped system.

In another embodiment of the inside roof construction according to the invention, depressions 8 are moulded in a lattice-shaped arrangement into the embossed sides of the moulded part 5. In a first embodiment these depressions exhibit a depth of approximately 10 mm and are also stamped in a simple manner. The bottom regions of these depressions 8 exhibit a flexural yield strength that is higher than in other regions. Thus, local regions with extremely high density are produced in the moulded part; and the result is a lattice structure made of highly compressed and therefore extremely non-deformable material which is also beneficial for the self-supporting stability of the entire moulded part. The depressions produced thus can be used naturally as cable rails, in particular for aerial, electrical and loud speaker cables. For safety reasons it is also possible naturally to install into such a designed moulded part 5 additional rails 9, preferably made of glass fiber reinforced polyester and to cement to the body member and/or the moulded part 5. These rails 9 also act simultaneously as stiffening braces for the body member 2. It is self-evident that these depressions 8 can also be incorporated into the moulded part 5 in such a manner that no significant local sealing differences form and that thus the overall stability remains unaffected.

Other embodiments of this construction have already been indicated. In particular, the side facing the passenger compartment can be lined with a decorative layer 10. The constructions according to the invention are not only applicable to the construction of vehicles but also the construction of machines, especially wherever, in addition to acoustic absorption, low frequency vibrations are to be damped.

We claim:

1. A vibration-damping roof construction comprising:

at least one body member having an interior surface and an exterior surface; and a sound-absorbing moulded part made of a porous, compressed fibrous web material and having a side facing said interior surface of said body member, said moulded part having locally stiffened regions giving said moulded part a self-supporting stability, and said side facing said body member having a waffle-like structured surface of spaced depressed surfaces separated by individual projecting segments arranged in a grid of spaced horizontal and perpendicular lines, said segments resting in contact with said body member, and said structured surface exhibiting an anisotropic air resistance.

2. The vibration-damping roof construction as claimed in claim 1, wherein at least some of said individual segments are affixed to said body member, whereby said moulded part is partially connected to said roof construction.

3. The vibration-damping roof construction as claimed in claim 2, wherein said waffle-like structured surface has lattice-shaped depressions formed therein, said lattice-shaped depressions having bottom regions exhibiting a flexural yield strength that is higher than in other regions.

4. The vibration-damping roof construction as claimed in claim 1, wherein said waffle-like structured surface has lattice-shaped depressions formed therein, said lattice-shaped depressions having bottom regions exhibiting a flexural yield strength that is higher than in other regions.

5. A vibration-damping roof construction comprising:

at least one body member having an interior surface and an exterior surface;

a sound-absorbing moulded part made of a porous, compressed fibrous web material and having a side facing said interior surface of said body member, said side facing said body member having a waffle-like structured surface of spaced depressed surfaces separated by individual projecting segments arranged in a grid of spaced horizontal and perpendicular lines, said segments resting in contact with said body member, and said structured surface exhibiting an anisotropic air resistance; and a load-bearing stiffening layer embedded in said moulded part, said stiffening layer giving said moulded part a self-supporting stability.

6. The vibration-damping roof construction as claimed in claim 5, wherein said stiffening layer is lattice-shaped.

7. The vibration-damping roof construction as claimed in claim 6, wherein at least some of said individual segments are affixed to said body member, whereby said moulded part is partially connected to said roof construction.

8. The vibration-damping roof construction as claimed in claim 5, wherein at least some of said individual segments are affixed to said body member, whereby said moulded part is partially connected to said roof construction.

9. The vibration-damping roof construction as claimed in claim 8, wherein said waffle-like structured surface has lattice-shaped depressions formed therein, said lattice-shaped depressions having bottom regions exhibiting a flexural yield strength that is higher than in other regions.

10. The vibration-damping roof construction as claimed in claim 5, wherein said waffle-like structured surface has lattice-shaped depressions formed therein, said lattice-shaped depressions having bottom regions exhibiting a flexural yield strength that is higher than in other regions.

11. A sound-absorbing lining suitable for use in the interior of a vibration-damping roof construction, said lining comprising:

a moulded part comprising a porous, compressed fibrous web material, said moulded part having locally stiffened regions giving said moulded part a self-supporting stability, and said moulded part having a side having a waffle-like structured surface of spaced depressed surfaces separated by individual projecting segments arranged in a grid of spaced horizontal and perpendicular lines, said structured surface being configured to impede air currents less in the lateral direction than the air flows at a right angle to the lateral direction.

12. The sound-absorbing moulded part of claim 11, wherein said waffle-like structured surface has lattice-shaped depressions formed therein, said lattice-shaped depressions having bottom regions exhibiting a flexural yield strength that is higher than in other regions.

13. A sound-absorbing lining suitable for use in the interior of a vibration-damping roof construction, said lining comprising:

a moulded part comprising a porous, compressed fibrous web material, said moulded part having a side having a waffle-like structured surface of spaced depressed surfaces separated by individual projecting segments arranged in a grid of spaced horizontal and perpendicular lines, said structured surface being configured to impede air currents less in the lateral direction than the air flows at a right angle to the lateral direction; and a load-bearing stiffening layer embedded in said moulded part, said stiffening layer giving said moulded part a self-supporting stability.

14. The sound-absorbing moulded part of claim 13, wherein said waffle-like structured surface has lattice-shaped depressions formed therein, said lattice-shaped depressions having bottom regions exhibiting a flexural yield strength that is higher than in other regions.

\* \* \* \* \*